Nov. 19, 1957 — C. G. EDMONDS — 2,813,360
FREIGHT CAR TRAFFIC CONTROL DEVICE
Filed Sept. 22, 1953 — 2 Sheets-Sheet 1
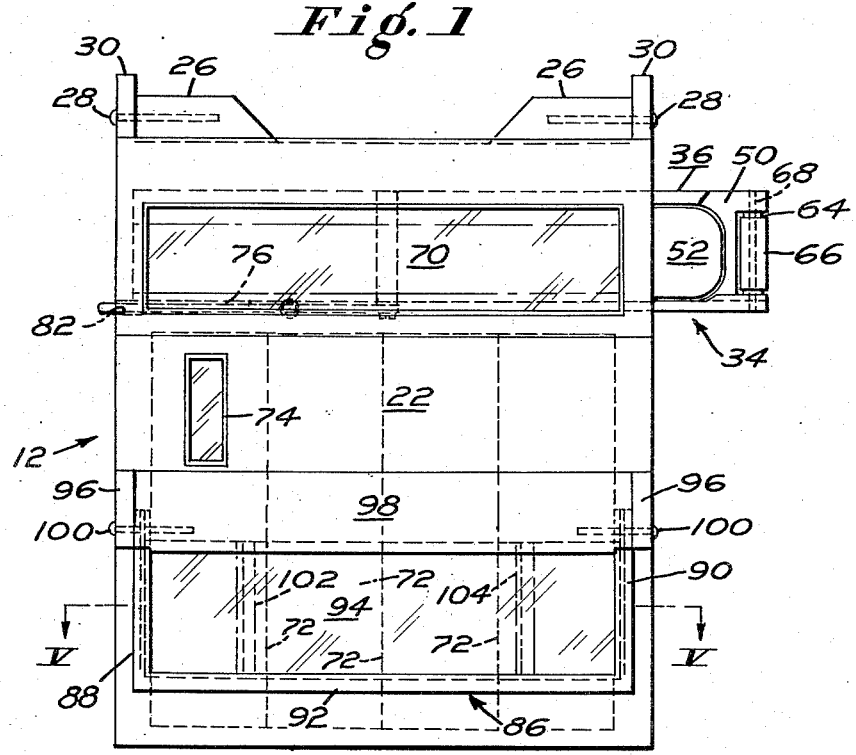
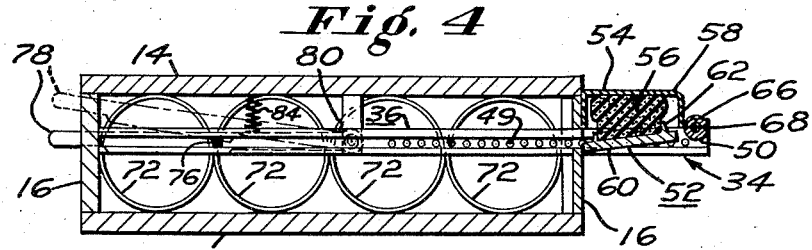
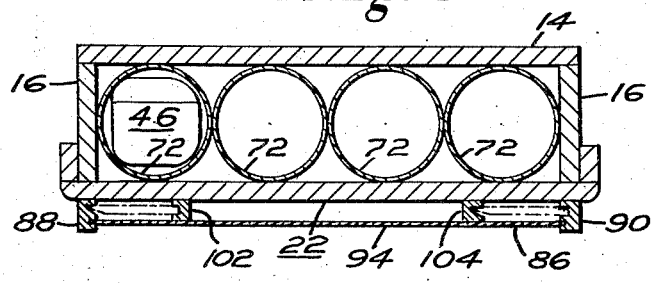 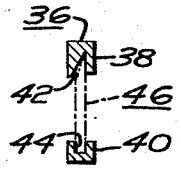
INVENTOR.
CHARLES GEORGE EDMONDS
BY
Beau, Brooks, Buckley & Beau,
ATTORNEYS.

Nov. 19, 1957  C. G. EDMONDS  2,813,360
FREIGHT CAR TRAFFIC CONTROL DEVICE
Filed Sept. 22, 1953  2 Sheets-Sheet 2

INVENTOR.
CHARLES GEORGE EDMONDS
BY
Beau, Brooks, Buckley & Beau
ATTORNEYS.

United States Patent Office 2,813,360
Patented Nov. 19, 1957

2,813,360

FREIGHT CAR TRAFFIC CONTROL DEVICE

Charles George Edmonds, Buffalo, N. Y.

Application September 22, 1953, Serial No. 381,551

10 Claims. (Cl. 40—19.5)

The invention relates generally to traffic control devices and more particularly to an improved device of this general type which is adapted to be fixed to a freight car, or the like, to store index tabs therein and to provide a visible traffic history legend and various visible freight car movement indicia therein in an improved manner.

It is established policy in the rail transportation art to make full use of available freight facilities for optimum operation efficiency. In order to compensate the individual railroads whose freight cars may be used to earn haulage fees, a system is now in effect whereby a per diem accounting is made by connecting carriers for use of non-system owned freight cars during the hauling operation. However, this system has proven to be cumbersome, susceptible to frequent errors and expensive to maintain; therefore, it is proposed that the device of the invention can be used to provide a progressive record of the movements of a railroad car from a shipping point and through connecting carriers to its various destination points. This record will be housed in this device in the hereinafter described manner so as to be carried by the car at all times and to expedite identification and movement thereof during transfer operations between connecting railway carriers. Thus, the record of freight car movements will be kept with minimum mental concentration so that clerical efforts in accomplishing the aforesaid per diem accounting will be greatly simplified as will be generally appreciated by those in the art in view of the fact that interim accounting steps may be eliminated and a single final accounting can be made upon return of a freight car back into the possession of the proprietor's line.

An object of the invention is to provide a device of the aforesaid type having improved display and storage means adapted to be used for progressively storing freight car traffic history tabs, or the like.

Another object of the invention is to provide improved tab locating and closure means arranged to permit easy insertion of freight car movement-recording tabs into the improved display means while retaining the tabs therein against accidental displacement therefrom.

Yet another object of the invention is to provide a display means tab clearing and storage device whereby the movement-recording tabs will be stored in consecutive order during various car switching operations at railway system freight car transfer points while keeping the most recent freight car traffic history clearly visible to expedite traffic and per diem accounting by railroads for freight cars.

Still another object of the invention is to provide a simplified arrangement of the invention which is sturdy and inexpensive to manufacture while at the same time being weather-tight.

Further objects and advantages of the invention will appear from the specification hereinafter.

In the drawings:

Fig. 1 is a front elevational view of an embodiment of the invention;

Fig. 4 is a sectional view taken along the line IV—IV of Fig. 3;

Fig. 5 is a sectional view taken along the line V—V of Fig. 1;

Fig. 6 is a partial sectional view taken along the line VI—VI of Fig. 2; and

Figure 2:
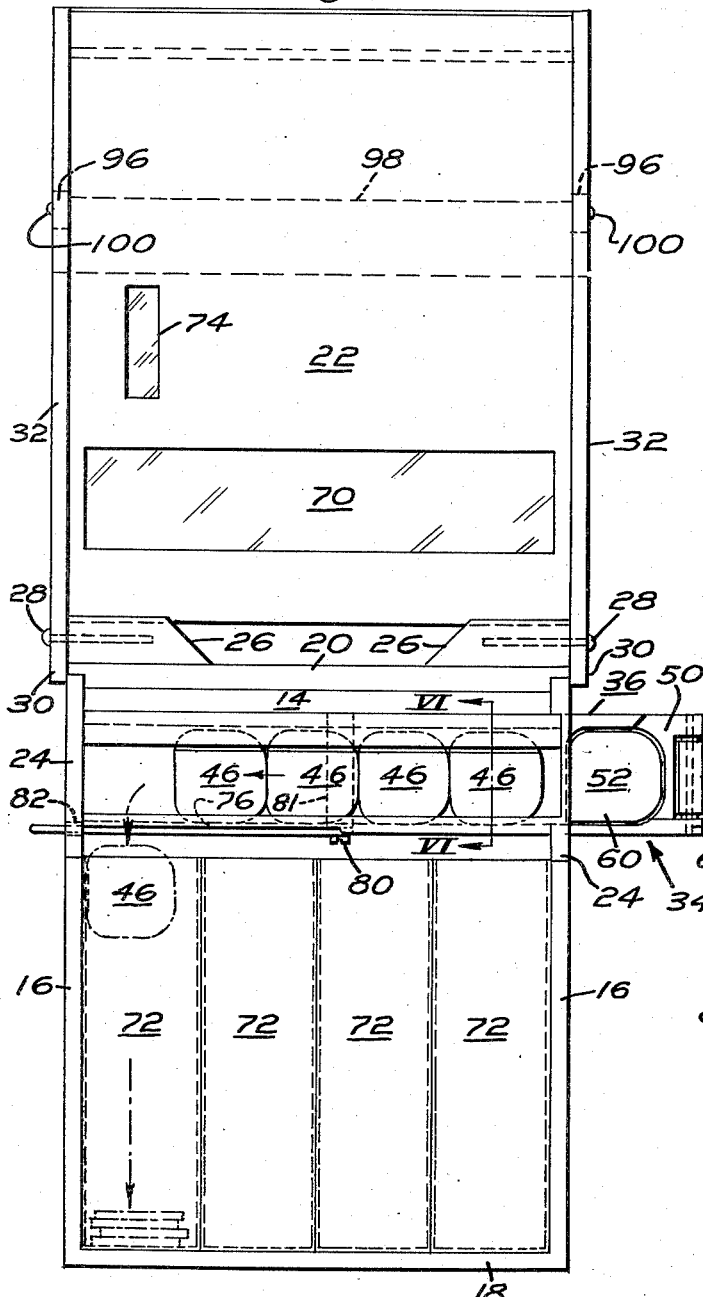
Fig. 2 is a view similar to that shown in Fig. 1 but showing the device in opened position.

Referring now to the drawing, the embodiment of the invention therein is shown to be mounted on a railroad freight-car wall 10 (Fig. 3) and generally includes a substantially rectangular housing 12 comprised of a back mounting plate 14 which can be fixed to the wall 10 by any conventional means, a pair of opposed side walls 16—16, a bottom plate 18, a top plate 20, and a hinged front cover member 22 (Figs. 1–5).

Figure 3:
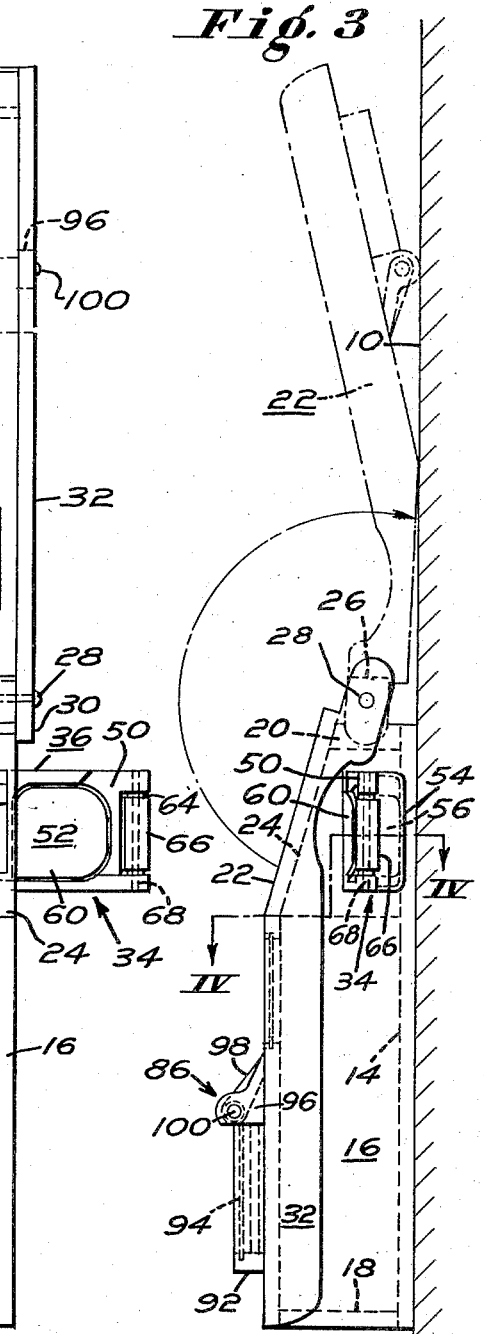
Fig. 3 is a side elevational view of the device of Fig. 1 shown to be fixed to a side wall of a freight car and showing the device in open position by the dotted lines thereof.

The upper portions of the side walls 16—16 are preferably formed as indicated in Fig. 3 to provide rearwardly inclined cover seats 24—24 for a correspondingly inclined portion to the cover 22. For the purpose of mounting the cover 22, there are provided a pair of mounting blocks 26—26 fixed at opposite ends of the upper housing plate 20 and extending upwardly of the housing proper.

The front cover 22 is then adapted to be hinged at its upper end by means of a pair of hinged pins 28—28 which are journalled through spaced ears 30—30 provided at opposite sides of the upper edge of the cover and which are embedded in the mounting blocks 26—26. The front face of the cover 22 preferably flares forwardly and then downwardly to conform to the front bearing seats 24—24 of the side walls 16—16 as noted hereinabove, and is provided at both sides with laterally rearwardly extending flange portions 32—32 substantially coextensive therewith which are arranged to snugly embrace the forward outer face portions of the side walls when the cover is pivoted into the closed position shown in solid lines in Figs. 1 and 3.

A particular feature of the present invention is to provide tab runner and display means as shown by way of example at 34 (Figs. 1, 2, 3 and 4). The tab runner mechanism 34 comprises a generally rectangular support member 36 which is fitted at one end through a side of the upper beveled portion of one of the side walls 16—16 to extend horizontally through the housing into abutting fixed relation with the opposite side wall thereof. The tab support member 36 is centrally cut away as most clearly shown in Figs. 2 and 6 to form, when in mounted position, a perimetrically enclosed frame providing upper and lower superposed tab runner portions 38 and 40, respectively.

Figure 7:
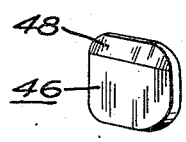
Fig. 7 is a perspective view showing a tab element of the invention.

As shown in Fig. 6, the tab runner portions 38 and 40 are preferably grooved from inwardly thereof in the forms illustrated at 42 and 44 so as to be arranged to selectively receive a typical routing tab 46 (Fig. 7) of the invention. The tabs 46 are preferably formed into plane polygonal form having an upper horizontal rearwardly beveled front face portion 48 so as to be adapted to be selectively fitted between the grooves 42 and 44. Thus, it will be appreciated as another feature of the invention that any information carried on the front face of the tab 46 will always be upright and readable when mounted in the mechanism 34 since the opposed grooves 42 and 44 will obviously admit the tabs 46 in only one preselected position thereof. The tab runner portion 40 is preferably perforated along the base of the tab groove 44 therein as indicated at 49 (Fig. 4) in order to clear any dirt and moisture which may be carried therein during insertion of the tabs and thereby to prevent sticking or jamming of the tabs in the runners.

It is noted that the front face of the tab support member 36 is recessed at its outer end as indicated at 50 (Figs. 1, 2, 3 and 4) to a depth corresponding to the plane of the back walls of the grooves 42 and 44, thereby permitting the tabs 46 to be slip-fitted therein. A tab positioning device 52 is fitted between the tab runner portions 38 and 40 outwardly of the housing proper as illustrated most clearly by way of example in Figs. 1, 2 and 4 for normally retaining the tabs against accidental displacement from the tab runner grooves 42 and 44 in the support 36 and for weather-seal purposes.

The mounting of the device 52 is accomplished as shown in Fig. 4 by fixing a sponge housing 54 to the rear face of the tab support member 36 and against the housing 12. Within this sponge housing 54 there is contained a resilient spongy mass 56 having a generally annular front portion which provides a generally rearwardly beveled front face 58 which carries a tab positioning plate 60 by means of a generally annular flange 62 thereof which is press-fitted over the sponge. The tab plate 60 is arranged to normally abut the side wall 16 forwardly of the tab support member 36 fitted therethrough and to slope rearwardly to extend into the superposed tab runner grooves 42 and 44 (Fig. 4). Thus, it will be appreciated that insertion of a tab may be accomplished as aforesaid by placing a tab on the tab plate 60 in its proper position and pressing thereagainst to overcome the resilient urge of the sponge mass backing 56 to place the tab in alignment with the tab runner grooves 42—44 whereupon the tabs need only to be pushed inwardly into slip-fitted engagement therein. It is a further feature of the invention to recess the outer end of the member 36 as indicated at 64 whereby a tab roller 66 can be mounted therein by means of an axle member 68 which is embedded in the recess walls to provide an improved means for rolling the tabs 46 into the grooves 38—40.

In order that the tabs will be visible when in their mounted position inwardly of the housing when the cover 22 is in its closed position, there is provided an elongate window therein as indicated at 70 (Figs. 1 and 2). The window 70 will preferably be formed from a transparent plastic, or the like, and is fitted in water-tight relation in the cover so that the unit will be substantially unaffected by the elements and will provide a rigid compact construction.

As clearly illustrated in Figs. 2, 4 and 5, a plurality of cylindrical tab storage receptacles 72 are arranged inwardly of the housing 12 so as to be adapted to receive the tabs 46 in consecutive order when cleared from the tab support member 36 in the hereinafter described manner. The receptacles 72 are preferably made of a transparent plastic material so that provision of a suitable window 74 in the cover 22 will show from externally of the unit when such a receptacle reaches full condition whereupon its position will be shifted to position an "empty" in its place.

The tab clearing means referred to hereinabove are provided in the present embodiment of the invention by cutting away the end of the bottom runner wall portion of the groove 44 for a distance slightly greater than the width dimension of a tab 46 as indicated at 76 in Figs. 1, 2 and 4. A blocking lever 78 is pivotally mounted as indicated at 80 by means of a pin 81 (Fig. 2) to the underside of the support member 36 and having its outer end portion extending through a suitable slot 82 in a side wall 16 to permit manual actuation thereof against the urge of a compression spring 84 into its tab clearing position as shown in dotted lines in Fig. 4. Of course, one end of the slot 82 will be arranged to support the tab blocking lever 78 in its tab blocking position against the force of the spring 84 as shown in the solid line position thereof in Fig. 4. Therefore, it will be appreciated that after a full row of tabs is mounted in the grooves 42—44 further tab insertions will be made possible only by actuating the lever 78 to drop one tab to make room for the next tab. Thus, the tabs will be stored in consecutive order and the most recently inserted car movement information tabs will remain clearly visible from externally of the unit.

More particularly, it is proposed that a unit of the herein described type will be mounted on all railroad freight cars for traffic accounting purposes. Further, each railroad station and transfer point between connecting rail carriers will be povided with a supply of the tabs 46 having stamped thereon identifying indicia for each particular transfer point and having a front surface thereon adapted for easy recordation thereon of the name of a transferor carrier and the date of delivery to the transferee carrier. Other identifying tabs of course, would be used to record other special information relating to freight car movements.

Thus, upon arrival of a freight car at a transfer point to a connecting carrier the transferee carrier can simply record the name of the transferor carrier and the date of delivery on a tab and insert it in the device of the invention in the above described manner, and similarly at various other transfer points en route to a final destination. It will be appreciated then, that at every point en route a progressive record of freight car movement will be contained in easily available form with minimum mental concentration and clerical recordation since yard workmen can safely be relied upon to distribute such tabs to incoming cars and they would be carried in an easily viewed position on the car.

As mentioned hereinabove, each carrier normally hauls freight in many non-system owned freight cars in earning its haulage fees and therefore must account to the proprietary railway line on a per diem basis. It will be appreciated that use of the device of the invention in the hereinabove described manner will permit ready computation of the number of days each freight car has been used by various connecting carriers enroute to its final destination and back. Thus, the present system of each carrier maintaining its own short records and forwarding duplicate copies to the respective proprietary car owners for accounting purposes can be eliminated in favor of a simple final billing operation by the proprietary owner upon return of his freight car containing the aforesaid progressive record as will be fully appreciated by those in the art. Of course, a device of the invention can be used to provide a secondary progressive record of freight car movements which can be available to double check the accuracy of present clerical accounting procedures if it is desired to retain such procedures.

Still another feature of the invention is to provide auxiliary record display means integral with the lower portion of the cover 22 as shown at 86 in Figs. 1, 3 and 5. The cover display means 86 includes upright frame members 88—90 and a lower horizontal frame member 92 which may be grooved to carry a transparent plastic window 94 in spaced parallel relation to the face of the cover 22. A pair of cover mounting lugs 96—96 are fixed outwardly of the upper portions of the upright frame members 88—90 in order to pivotally mount a weather cover 98 by means of a pair of end pins 100—100 journalled through the lugs and embedded in the weather cover. Thus, the edge of the cover 98 is adapted to abut the face of the housing cover 22 rearwardly of its pivotal mountings to provide a downwardly bearing outer deflection surface over the auxiliary display means for shutting out the elements therefrom.

A pair of vertical spacer members 102—104 are preferably provided to compartmentalize the auxiliary display space, and the inner side walls of the end compartments formed thereby will preferably be grooved as shown in Figs. 1 and 5 to selectively receive specially designated tabs 46 in a preselected position in a way similar to the arrangement of the grooves 42 and 44 hereinabove particularly described. The central compartment of the display space will be available for data tabs of a more permanent nature which might be used for example to identify the particular shipment contained in the car or to carry special shipping instructions.

Therefore, it will be understood that although only one particular form of the invention has been shown and described in detail it will be apparent to those skilled in the art that the invention is not so limited but that various other changes may be made therein without departing from the spirit of the invention or the scope of the appended claims.

I claim:

1. An indicator tab storage and display mechanism adapted to be fixed to a freight car for receiving routing information tabs at various transfer points between connecting carriers comprising a generally rectangular housing having a front cover hinged thereto and being fitted to weatherseal said housing when in closed position, elongated superposed groove means extending substantially horizontally across said housing and through an opening in a side thereof for selectively receiving successive routing information tabs therebetween through said side of said housing, tab discharge means arranged in said groove means adjacent the opposite side of said housing, and tab storage receptacle means mounted within said housing to progressively receive from said discharge means said routing information tabs for storage therein in consecutive order, whereby a complete progressive traffic history of the freight car movements in the form of information tabs will at all times be carried by the car to facilitate routing and accounting therefor.

2. An indicator tab storage and display mechanism adapted to be fixed to a freight car for receiving routing information tabs at various transfer points between connecting carriers comprising a generally rectangular housing having a front cover hinged thereto and being fitted to weatherseal said housing when in closed position, substantially horizontal track means fitted in said housing to carry successive indicator tabs in positionally adjacent relation across said housing and being arranged to extend through an aperture in a side wall portion thereof, resiliently mounted cover means for said aperture being arranged normally to close said aperture and being adapted to be moved into open position incidental to placing of an indicator tab thereon and pressing it against the resilient mounting of said cover means for insertion through said aperture for engagement in said track means, tab discharge means fitted in the bottom of said track means inwardly of the opposite housing wall portion, and storage means in said housing for successively storing indicator tabs discharged through said tab discharge means; said front cover being provided with a window for visibly displaying the successive indicator tabs in said track means to facilitate routing and accounting procedures for said car.

3. A freight car traffic control device comprising a generally rectangular housing adapted to be fixed to a freight car wall and being closed at its front face by a front cover, said front cover being arranged to flare forwardly and then downwardly and having lateral rearwardly extending flanges at both sides substantially coextensive therewith to snugly embrace the housing side walls, said forwardly flared cover portion being provided with elongate horizontal window means, horizontal tab runner means fitted through an aperture in a side wall of said housing and being spaced behind said window means inwardly of said housing, said runner means extending outwardly of said housing side wall through said aperture and having groove means for receiving tab members arranged to be selectively fitted therein, and gate means fitted in said outwardly extending runner means, said gate means having resilient backing means normally urging said gate means to obstruct said groove means whereby said tab members will be selectively positioned on said gate means and pushed against the urge of said resilient backing means to position them into alignment with said groove means for slip-fitting therein to be displayed behind said window means.

4. An indicator tab storage and display mechanism adapted to be mounted on a freight car for receiving routing information tabs at various transfer points between connecting carriers comprising a generally rectangular housing having a front cover hinged thereto and being fitted to weatherseal said housing when in closed position, elongate superposed groove means extending through an opening in a side wall portion of said housing, said groove means being adapted and arranged to selectively receive successive routing information tabs therebetween in a preselected positional relation, said tabs being formed to fit into said groove means in only one preselected position, tab discharge means arranged in the bottom of said groove means inwardly of the opposite side wall portion of said housing, and removable tab storage receptacle means mounted within said housing to receive said routing information tabs as they are progressively discharged through said tab discharge means for storage therein in consecutive order, whereby a complete traffic history of the freight car movements will at all times be carried by the car to facilitate routing and accounting therefor.

5. An indicator tab storage and display mechanism adapted to be fixed to a freight car for receiving routing information tabs at various transfer points between connecting carriers comprising a generally rectangular housing having a front cover hinged thereto and being fitted to weatherseal said housing when in closed position, horizontal superposed track means fitted in said housing to carry successive indicator tabs in positionally adjacent relation across said housing and being arranged to extend through an aperture in a side wall portion thereof, tab locating cover means having a plane front face substantially parallel with a substantially medial plane through said track means, resilient cover backing means permitting substantially lateral cover movement relative to said medial plane so that an indicator tab may be placed thereon and positioned against the urge of said backing means into substantially coplanar relation with said medial plane for slip-fitting through said aperture into said track means, tab discharge means located in the bottom of said track means and inwardly of the opposite housing wall portion, and removable tab storage means for receiving indicator tabs successively discharged through said tab discharge means; said front cover being provided with a window in front of said horizontal track means for visibly displaying the successive indicator tabs mounted therein.

6. A freight car traffic control device comprising a generally rectangular housing adapted to be fixed to a freight car wall and being closed at its front face by a front cover, said front cover being arranged to flare forwardly and then downwardly and having lateral rearwardly extending flanges at both sides substantially coextensive therewith to snugly embrace the housing side walls, said forwardly flared cover portion being provided with elongate horizontal window means, and horizontal tab runner means fitted rearwardly of said window means through an opening in a side wall portion of said housing, said runner means extending outwardly of said housing side wall through said opening and providing superposed groove means adapted to selectively receive successive information tab members arranged to be selectively fitted and maintained in a preselected positional orientation relative thereto during passage therebetween to provide a visible upright record of freight car movements.

7. An indicator tab storage and display mechanism adapted to be fixed to a freight car for receiving routing information tabs at various transfer points between connecting carriers comprising a housing having a front cover fitted to weatherseal said housing when in closed position, elongate superposed groove means substantially horizontally spanning the interior of said housing and extending through a side wall portion thereof, said groove means being arranged to selectively receive successive routing information tabs which will be adapted to be selectively fitted and maintained in a preselected positional relation thereto during passage therebetween for displaying right side up information thereon, selectively operable tab discharge means arranged in connection with said groove means, and replaceable tab storage receptacle means mounted within said housing below said tab discharge means to progressively receive discharged routing information tabs for storage therein in consecutive order, whereby a complete traffic history of the freight car movements will be at all times carried by the car to facilitate routing and accounting therefor.

8. An indicator tab storage and display mechanism adapted to be fixed to a freight car for receiving routing information tabs at various transfer points between connecting carriers comprising a generally rectangular housing having a front cover hinged thereto and being fitted to weatherseal said housing when in closed position, horizontal superposed track means spanning the interior of said housing and extending through a slot in a side wall portion thereof to successively admit a plurality of indicator tabs in positionally adjacent relation across said housing, manually operable tab discharge means arranged in connection with the end of said horizontal track means, and replaceable tab storage means contained within said housing for progressively receiving indicator tabs successively discharged by said tab discharge means; said front cover being provided with a window in front of said horizontal track means for visibly displaying said successive indicator tabs during their movement through said track means to provide an easily accessible record of freight car movements to expedite routing and accounting procedures.

9. A freight car traffic control device comprising a generally rectangular housing adapted to be fixed to a freight car wall and being closed at its front face by a front cover, said front cover being arranged to flare forwardly and then downwardly and having lateral rearwardly extending flanges at both sides substantially coextensive therewith to snugly embrace the housing side walls, said forwardly flared cover portion being provided with elongate horizontal window means, horizontal tab runner means fitted at one end through a side wall of said housing and being spaced rearwardly of said window means, said runner means providing superposed grooves arranged for selectively receiving information tabs adapted to be selectively fitted therein so as to be maintained with its information in right side up position during passage in said grooves, and tab storage receptacle means within said housing for progressively receiving said information tabs from the opposite end of said tab runner means whereby the recent traffic history tabs will be clearly visible to expedite routing of the freight car while the earlier traffic history tabs will be stored in consecutive order in said receptacle means providing a simple basic traffic record control.

10. A freight car traffic control device comprising a housing adapted to be fixed to a freight car wall, the front of said housing including a cover portion having a transparent portion therein and being adapted to be opened to permit access into said housing, a plurality of information tab members, and a pair of superposed tab runner means crossing said housing at the level of said transparent cover portion and extending outwardly through and opening in a side wall portion of said housing, said tab members and said tab runner means being arranged for selectively fitting inter-relation whereby successive tab members will be placed in guided relation adjacent each other in said track means and will be maintained in a predetermined orientation with respect to each other and said track means so that the information carried thereon will be right side up and visible through said transparent cover portion to provide a visible record of freight car movements.

References Cited in the file of this patent

UNITED STATES PATENTS

| | | |
|---|---|---|
| 653,847 | Rickets | July 17, 1900 |
| 1,179,584 | Waugh | Apr. 18, 1916 |
| 2,022,407 | Cordone | Nov. 26, 1935 |
| 2,036,762 | Lindstrom | Apr. 7, 1936 |
| 2,083,403 | Rowe | June 8, 1937 |
| 2,122,024 | Chouinard | June 28, 1938 |
| 2,334,896 | Brady | Nov. 23, 1943 |